(12) United States Patent
Sudhakar

(10) Patent No.: US 7,996,547 B2
(45) Date of Patent: Aug. 9, 2011

(54) SYSTEM FOR COORDINATING REGISTRATION AND MANAGING PEER-TO-PEER CONNECTIONS FOR DATA REPLICATED BACKUP AND VERSIONING

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 12/793,926

(22) Filed: Jun. 4, 2010

(65) Prior Publication Data

US 2010/0250713 A1    Sep. 30, 2010

Related U.S. Application Data

(62) Division of application No. 12/027,843, filed on Feb. 7, 2008, now Pat. No. 7,752,168.

(51) Int. Cl.
    G06F 15/16    (2006.01)
(52) U.S. Cl. ......... 709/229; 709/227; 709/224; 709/225
(58) Field of Classification Search .................. 707/640, 707/641, 645, 646, 647, 648, 649, 650, 651, 707/652, 653; 709/216, 224, 223, 225, 227, 709/229; 705/51; 725/111; 715/500
See application file for complete search history.

(56) References Cited

U.S. PATENT DOCUMENTS

| | | | |
|---|---|---|---|
| 6,148,383 A | 11/2000 | Micka et al. | |
| 6,892,210 B1 | 5/2005 | Erickson et al. | |
| 6,928,476 B2 | 8/2005 | Bucher | |
| 7,069,295 B2 | 6/2006 | Sutherland et al. | |
| 7,529,785 B1 | 5/2009 | Spertus et al. | |
| 2003/0004882 A1* | 1/2003 | Holler et al. | 705/51 |
| 2004/0088646 A1* | 5/2004 | Yeager et al. | 715/500 |
| 2005/0125536 A1 | 6/2005 | Bucher | |
| 2005/0262167 A1* | 11/2005 | Teodosiu et al. | 707/652 |
| 2006/0041619 A1 | 2/2006 | Gusler et al. | |
| 2006/0190716 A1 | 8/2006 | Miller | |
| 2006/0271601 A1* | 11/2006 | Fatula et al. | 707/652 |
| 2007/0208748 A1 | 9/2007 | Li | |
| 2008/0005195 A1 | 1/2008 | Li | |
| 2008/0077635 A1* | 3/2008 | Sporny et al. | 707/652 |
| 2008/0147821 A1* | 6/2008 | Dietrich et al. | 709/216 |
| 2008/0235746 A1* | 9/2008 | Peters et al. | 725/111 |
| 2008/0243953 A1 | 10/2008 | Wu et al. | |
| 2009/0204700 A1 | 8/2009 | Satya Sudhakar | |

OTHER PUBLICATIONS

"U.S. Appl. No. 12/027,843, Non-Final Office Action mailed Nov. 17, 2009", 7 pgs.
"U.S. Appl. No. 12/027,843, Notice of Allowance mailed May 12, 2010", 10 pgs.
"U.S. Appl. No. 12/027,843, Response filed Feb. 17, 2010 to Non Final Office Action mailed Nov. 17, 2009", 14 pgs.

* cited by examiner

*Primary Examiner* — Le Luu
(74) *Attorney, Agent, or Firm* — Schwegman, Lundberg & Woessner, P.A.

(57) ABSTRACT

Techniques are presented for peer-to-peer (P2P) replicated backup and versioning. Peer clients register and share storage with one another for purposes of P2P data replication, data versioning, and/or data restoration via a P2P server. The P2P server also provides security and management between the peer clients. Moreover, the P2P sever can audit behaviors of the peer clients and take punitive actions against any of the peer clients that violate policy.

9 Claims, 3 Drawing Sheets

SYSTEM FOR COORDINATING REGISTRATION AND MANAGING PEER-TO-PEER CONNECTIONS FOR DATA REPLICATED BACKUP AND VERSIONING

This application is a divisional of U.S. patent application Ser. No. 12/027,843, filed on Feb. 7, 2008, now issued as U.S. Pat. No. 7,752,168, which is incorporated herein by reference in its entirety.

BACKGROUND

Data and information are rapidly becoming the life blood of enterprises. Transactions with customers, operational data, financial data, corporate intelligence data; in fact, all types of information are now captured, indexed, stored, and mined by enterprises in today's highly competitive and world economy.

Since information is vital to the enterprise, it is often made available twenty-four hours a day, seven days a week, and three hundred sixty-five days a year. To achieve this, the enterprises have to implement a variety of data replication, data backup, and data versioning techniques against their data models, users' storage devices, and/or their data warehouses.

It is not unusual for an enterprise to expend roughly $6 for every gigabyte (GB) of data storage used for data backup and replication per year. This is a best case scenario and does not include the management overhead, risk associated with data loss, restore overhead in the event of data loss, periodic tape drive cleansing overhead/cost, higher recover times when data is lost, etc.

In fact, assuming an enterprise has 10,000 employees each employee having a modest 20 GB of data, then the cost of data backup and replication is $1,200,000 (20×$6×10,000). Again, this is best case scenario and does not even account for a variety of overhead costs, which were discussed above. Thus, it can be seen that data backup and replication for medium to large enterprises can easily be in the millions of dollars and can affect the enterprise's bottom line in any year but most especially during tough or lean years.

Additionally, many users of an enterprise never fully utilize their existing storage capacity. Still, the enterprise has to retain sufficient backup space to account for the situation when a user does fully utilize his/her storage capacity. So, the reality is and enterprise not only expends a lot of time, resources, and money on data backup and replication but the enterprise is also wasting and underutilizing a lot of existing storage capacity.

Thus, it is desirable to have improved techniques for data backup and replication within enterprises.

SUMMARY

In various embodiments, techniques are provided for coordinated peer-to-peer (P2P) replicated backup and versioning. More particularly and in an embodiment, a method is provided for registering and configuring a client for coordinated P2P replicated backup and version. A registration request is received from a first peer client. Usage metrics are interactively acquired from the first peer client. The first-peer-client storage on the first peer client is divided into a configurable number of slots in response to some of the usage metrics. A first number of the slots on the first peer client are allocated for exclusive use of the first peer client. Next, a maximum number of second peer clients are determined, where the second peer clients are used by the first peer client for data replication or data versioning of the first number of the slots. The data replication and data versioning occur via a peer-to-peer (P2P) communication between the first peer client and each of the second peer clients. Finally, the first peer client, the slots, and the maximum number of second peer clients are registered for P2P data sharing and data management.

DETAILED DESCRIPTION

According to an embodiment, the techniques presented herein may be implemented within Novell products distributed by Novell, Inc. of Provo, Utah. Of course it is to be understood that any network architecture, device, proxy, operating system (OS), or product may be enhanced to utilize and deploy the techniques presented herein and below.

Figure 1:
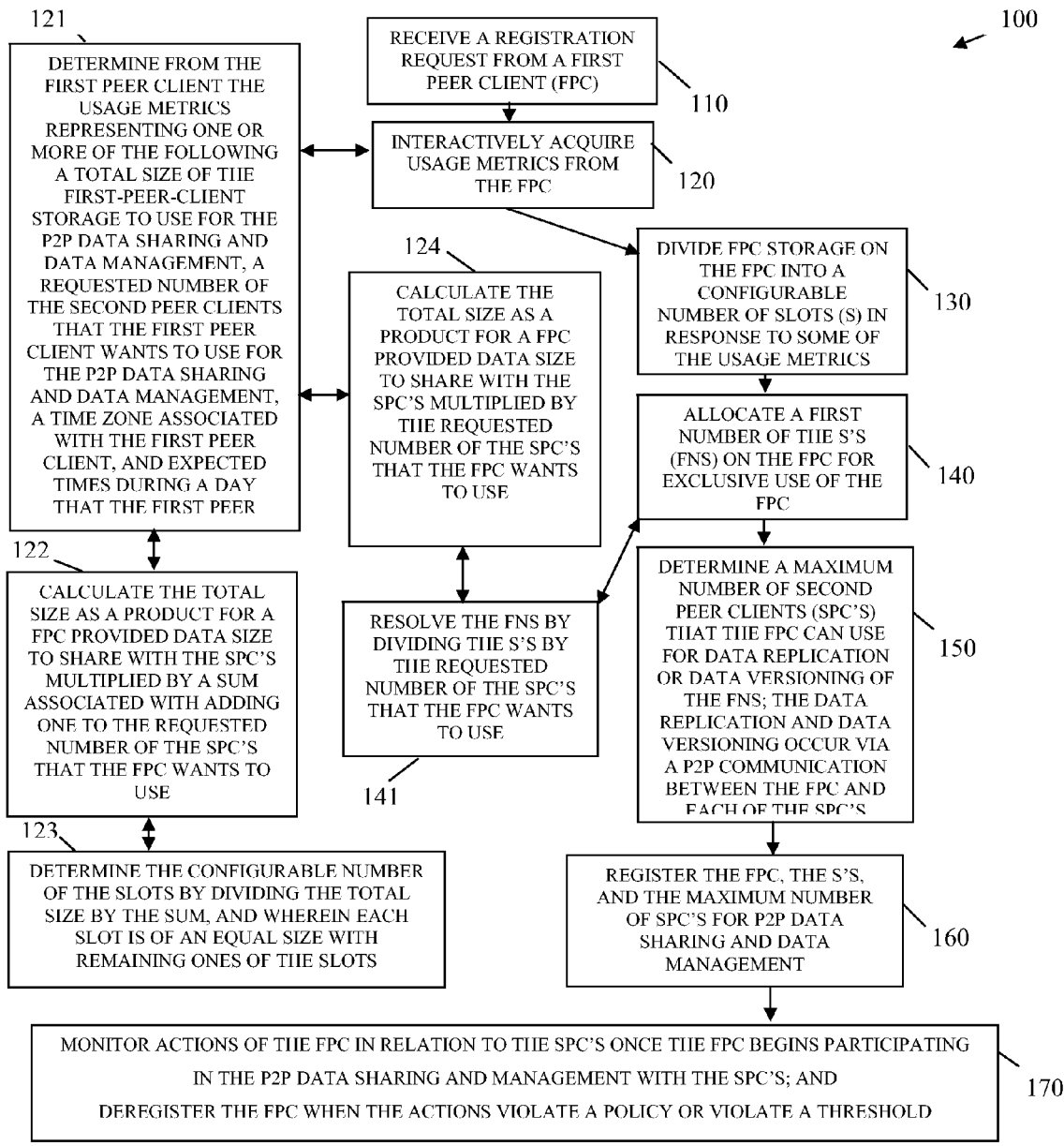
FIG. 1 is a diagram of a method for registering and configuring a client for coordinated P2P replicated backup and version, according to an example embodiment.

FIG. 1 is a diagram of a method 100 for registering and configuring a client for coordinated P2P replicated backup and version, according to an example embodiment. The method 100 (hereinafter "P2P registration service") is implemented in a machine-accessible and computer-readable medium as instructions that process on a machine (computer, processor-enabled device, etc.) and the P2P registration service is accessible over a network. The network may be wired, wireless, or a combination of wired and wireless.

The P2P registration service is implemented within and processes on a P2P centralized server machine. Users interact with their client machines (referred to as "peers" or "peer clients" herein) to register with and be configured by the P2P registration service for P2P data sharing and management with other peer clients.

At 110, the P2P registration service receives a registration request from a first peer client. The first peer client desires to share storage associated with its processing environment and desires to have one or more other second peer clients remotely located over the network house replicated backup data for the first peer client's storage or to house versioned data for the first peer client's storage.

The request can be received from a user associated with the first peer client. Alternatively, the request can be received from an automated service or daemon running of the first peer client. In some cases, the request can be received from an administrator on behalf of the first peer client and from a machine that is not associated with the first peer client.

Before the first peer client can share storage and have storage accessible via other peer clients, the first peer client has to register via the P2P registration service. The registration request received at 110 reflects the initiation of that registration.

At 120, the P2P registration service interactively acquires usage metrics from the first peer clients. A variety of usage metrics can be received from information obtained from the first peer client. Some of the information may be acquired automatically from the first peer client, some of the information may be calculated to produce other information, and some information may be acquired from a user that interacts on the first peer client.

For example, at 121, the P2P registration service determines from the first peer client the usage metrics. The usage metrics include one or more of the following: a total size of the first peer client storage to use for P2P data sharing and data management; a requested number of second peer clients that the first peer client wants to use for the P2P data sharing and data management, a time zone associated with the first peer client, expected times during a typical day that the first peer client is operational, etc. More examples, usage metrics that can be acquired from the first peer client is provided in detail below with the sample illustration that immediately follows the discussion of the FIG. 1 and can be used with the process of the P2P registration service.

In an embodiment, at 122, the P2P registration service calculates the total size as a product for a first-peer-client provided data size to share with the second peer clients multiplied by a sum. The sum is acquired by adding one to the requested number of the second peer clients that the first peer client wants to use for P2P data sharing and data management. For example, suppose the data size that first peer client wants to share is 20 megabytes (MB) and the number of second peer clients that the first peer client wants to use is 4, then the total size 100 MB (20×(4+1)). The extra one permits a fifth second peer client to later come on board and accounts for such a situation in advance. Whether one is added or not can be a configurable parameter or profile that is set by an administrator. More discussion of this is presented in greater detail below with the illustrations that immediately follow the discussion of the FIG. 1.

In some cases, at 123, the P2P registration service determines the configurable number of the slots by dividing the total size by the sum. Each slot is of equal size with the remaining ones of the slots. So, in our previously presented example each slot is 100 MB divided by 5 (number for second peer clients+1 (accounting for a later extra second peer client that wants to participate)), which equals 20 MB's.

In some cases, the administrator may decide that reserving an extra slot of the storage from the first peer client is not desired. In such a case, at 124, the P2P registration service calculates the total size as a product for the first-peer-client data size to share multiplied by the requested number of the second peer clients that the first peer client wants to use.

At 130, the P2P registration service divides the first peer client storage on the first peer client into a configurable number of slots in response to some of the usage metrics, as discussed above with the processing associated with 122-124. The first peer client retains one or more of the slots and the other slots on the first peer client are available for use by second peer clients during P2P data sharing and data management.

At 140, the P2P registration service allocates a first number of the configurable number of slots on the first peer client for exclusive use of the first peer client. So, at 141, the P2P registration service resolves the first number of slots by dividing the configurable number of slots by the requested number of the second peer clients that the first peer client wants to use.

At 150, the P2P registration service determines a maximum number of second peer clients that the first peer client can use for data replication and/or data versioning of the first number of slots (allocated to the first peer client at 140). The data replication and data versioning occur via P2P communications between the first peer client and each of the second peer clients.

At 160, the P2P registration service registers the first peer client, the configurable number of slots, and the maximum number of second peer clients for P2P data sharing and data management, which is associated with P2P data replication and data versioning.

According to an embodiment, at 170, the P2P registration service monitors actions of the first peer client in relation to the second peer clients once the first peer client begins participating in the P2P data sharing and data management with the second peer clients. The P2P registration service can deregister the first peer client when the first peer client takes any action that violates one or more policies or that violate one or more configured thresholds (discussions of scenarios for these situations are presented in greater detail herein and below).

Some example illustrations and variations on the processing associated with the P2P registration service are now presented for purposes of comprehension.

How Much Storage to Share:

Each user who wants to have data replicated has to share a little more than an equal amount of his/her disk space. So, say that a user wants 20 GB to be replicated across 4 locations. Then the user has to share 100 GB. An administrator can configure to share only 80 GB also but sharing more gives certain advantages, such as what was mentioned above with respect to the processing at 122. Again, whether 80 or 100 MB is used depend on the setting chosen by the administrator of the P2P registration service.

The P2P registration service coordinates the P2P connections.

A Peer Client User Interface (UI):

When the peer client US is first installed it asks for the time zone and what times of the day and how much time (estimated) the peer client is on-line. This was discussed above with references to the usage metrics at 120-121. This is used to select appropriate peers for the user of the first peer client, so that the on-line times overlap with the user associated with the first peer client. Next, the peer client UI is used to ask for how many replicas/versioning clients that the user wants to have. A minimum can be set to 4 and maximum can be configurable up to 10. But if the user chooses more than 4 then there are many peers, which may connect to first peer client. However, the P2P registration service coordinates this so that at max 'x' (x is also configurable) second peer clients may connect to the first peer client. This coordination can also be achieved using cryptographically, which is explained in greater detail below. The US is also used to ask as to how many parallel connections the user can accept when servicing data of other peers with a minimum set to 1. The number chosen is again displayed under a text box (of the UI) for a second option that says how many connections the user can make to other peer's in requesting and servicing the user's data. This second option is read-only and displays the same number as the user has chosen with first option. So, if the user allows servicing 2 peer's data simultaneously then the user in turn is serviced by 2 peers at most for the user's data. These connections are associated with the P2P data sharing and management and it is noted that connection to the P2P registration service is always available to the first peer client and the second peer clients of the network. Moreover, all of these settings can be changed at any time via the UI or administrative override.

Number of Replicas or Versioning Second Peer Clients

In an embodiment, the user chooses 4 or more replicas that are incremented by one (# of replicas+1) for storage allocation. This is because if 4 users come on-line and share between themselves then what happens to a 5th user who has newly joined? Such a user will not have any one to store data with. One way to solve this is to always have some free space.

(This also solves the problem where the user did not come on-line for a very long time, say, for months/years in which case the user can retrieve the data but the whole system has still got the space.) Now, if the free space is there for 5th user, that user can share at least 2 of the remaining 4 and when 6th and 7th user joins he can share the remaining with them. Allocation is done such a way that there will be at least 4 slots left between different users. The first to come has the most of the redundant data. Consider the following example scenario where T stands for a particular time frame and X stands for a particular user:

T0: X0 joined and offers 5 slots. X0 gets 2 slots.

T1: X1 joined and offers 5 slots. X0 gets one more slot and X1 gets 2 slots

T2: X2 joined and offers 5 slots. X0 gets one more slot (so, X0 got all his 4 slots) and X1 gets one more slot and X2 gets 2 slots.

T3: X3 joined and offers 5 slots. X1 gets one more slot (So, X1 got all his 4 slots) and X2 gets one more slot and X3 gets 2 slots.

Free Space Management by the P2P Registration Service

The space offered is divided into chunks and is managed by the P2P registration service. The slot is allocated, in some embodiments, by best fit algorithm. The space offered by a user is at the most divided into x slots. This x can be 6 by default. Note that this is a maximum. In actual practice, the entire space may be used as a single chunk; if the space is being offered by the first peer client is small in size. Optionally, there can be a minimum limit on the space that is offered by the first peer client. This max number x is to avoid too many chunks; there by avoiding connecting too many peers to a single system if the user offers more space. However, if the user has huge memory requirements with no compatible systems available with similar storage then optionally the user can select to have more than max number of connecting peers and accept the overhead. Otherwise, the user can have single replica of his data and have other replicas after suitable storage is available by waiting until then.

Server Coordinated Connections

One peer client (B) that wants to connect to another peer client (A); B asks the P2P registration service for permission. Actually, B can ask the server for a list of peers for whom B's data is replicated and B can subsequent ask the P2P registration service to give permission to connect to one of the peers depending on the on-line availability of those peers. For the remaining discussion A and B are used for purposes of illustration and comprehension although it is to be understood that there can many peers, such as 10 or even more (configured amount). The P2P registration service sees if B is anyway related to A or not. If not then it does not issue a packet for access. The P2P registration service then sees how many other peer clients are currently connected to A, according to usage data associated with A and how many more peer clients can permissibly connect to A according to A's setting of max concurrent connections set by A's owner/administrator. Two example cases are now presented:

Case 1:

If no peer clients are connected to A or if at least one more connection is possible to A then the P2P registration service gives B, an access packet signed by the P2P registration service that contains a serial number, which gets incremented for each connection to A; a time period (T); and the names (unique identifiers) associated with both A and B. The time period (T) is determined by taking the following into consideration:

1. How much A is burdened on average in the last 'x' hours of uptime of A. This can be configured with a default of 15 hours, for example.

2. How many connection requests came for A in the last 'x' hours of uptime of A.

3. How many times B connected to A in the last 'x' hours of uptime of A.

But, a minimum time period is guaranteed to ensure any useful talk or transfer happens within that time. The P2P registration service marks that much time period+some grace period (say 3 minutes) for B and notes that B is now engaged.

Now, B on receipt of this packet from the P2P registration service sends the packet to A after connecting. A verifies the signature, sees the time period, and allows B to continue to talk if the serial number is greater than last connection's serial number or if the serial number is not used and is at most less than 10 than last connection's serial number. This configured limit of 10 is so that B can keep track of at most the last 10 numbers as to whether they are used or not. Again, this number 10 is configurable. Now, at the end of that time period, B can choose to continue talking with A if there are no more requesting connections to A.

Case 2:

There is an existing connection from some other peer client to A and no more connections to A are possible according to the P2P registration service's usage data for A. Now, B is asked to wait. If there are many clients like B that are also waiting to connect with A, then a preference algorithm can be used. The preference is based on P.; where P=(number of hours requests are serviced by a particular peer client in its last x hours of up time/4)/(number of hours the services of peers used by the particular peer client in the last x hours of up time).

After service is over, B reports the following to the P2P registration service: the processing throughput it received from A, the time period it was allowed to connect to A, how much data it downloaded from A and uploaded to A. The same information is reported by A to central server. These 2 reports must substantially match with one another. If not then there is an attack by either A or B (discussed below). Now, the P2P registration service decides how many connections A should have at most based on this data. If all peers are experiencing low service then the P2P registration service reduces the number of concurrent connections possible for A also limiting A's number of concurrent requests for its peers along with max space that A can have or offer. If B reports low throughput and if peer's requesting their data on B also reports low throughput then the problem is with B and B has to increase its bandwidth or resources so the P2P registration service reduces connections for B and limits maximum replicas that B can have and max space B can offer until throughput is increased. If the space that A/B can hold is reduced by the P2P registration service then the extra peers' data already existing on A/B is replicated to other free space of other nodes by its peers on notification from the P2P registration service. The P2P registration service in this case gives access to that other nodes' free space to these peers.

The minimum bandwidth is guaranteed by the P2P registration service using past or historical usage data.

From A's Point of View:

Assume the max number of connections to service peers is set to 1 on A. When a connection comes from B, if there is already a connection from C then even if the max connections setting is 1 still A allow the connection from B and verify the packet presented, which B received from the P2P registration service. If the packet is valid then A services B and shutdowns the service with C after C's time period is over. C's time period may overlap with B's time period as there is a grace time in the entire system that can be configured in by the P2P registration service. Or, A is continuing connection with C.

In Case of Internet—if Inside Firewall

The network discussed herein for which the P2P data management and data sharing is associated applies equally to the Internet as well as an enterprise's internal Intranet. One difference is with a firewall environment. The technique discussed when a peer client is inside firewall is already technically within a P2P world and is called "push request". The client wanting to download a file sends a so called "push request" to a server (a push proxy, which can be different from the P2P registration service) for the other remote client, which is inside firewall, to initiate the connection instead (to "push" the file). The proxy sends a "push request" to that other remote client on behalf of the client. The remote client then sends the file to the push proxy from which the first client gets it.

Various attack scenarios can also be detected by the P2P registration service. Some of these are discussed in the illustrative examples below and some are also presented below with the discussion of the FIGS. 2 and 3.

Free Rider Attack Scenario #1

If the peer client B closes connections prematurely while servicing other peer clients or does not allow connections to itself, then the peers report it to the P2P registration service. The P2P registration service then sees if all peers are saying same thing or not about B's actions in prematurely closing connections. If so, then the P2P registration service decides that B is a free rider who uses the P2P data sharing and data management facility and does not give back an appropriate service level in return. Now, the P2P registration service notifies B about this condition and asks B to take appropriate action to cease and desist this activity. If B continues to not service connections appropriately then the P2P registration service can remove B from P2P data management and sharing facility and the P2P registration service can direct all peers holding B's data to delete that data and free the space up. The P2P registration service also redirects all peers whose data is residing on B to replicate to other peer clients' free space by giving the access to those peer clients' free space.

Free Rider Attack Scenario #2

Peer client B can selectively close the servicing of other peers or B does not allow connections to B when it should; this can be addressed in two ways. Either B can deny/close just a particular peer client's service or B can close/deny a connection of a randomly selected peer. In the first case, the particular peer is asked by the P2P registration service to relocate the particular peer's data to other free space of other peer clients by giving access to that particular peer client along with marking B for further watching and monitoring. Now, B is asked to free space of this particular peer and a new peer is assigned for that space. If such cases become more frequent, say B's actions continue and reaches a threshold of 'x' number, then B is notified about this and is marked as attacker. If B still does not change its behavior then B is removed from the P2P data sharing and data management. If B randomly denies/closes connections then each time this event happens, the peers notify the P2P registration service about B's actions and the P2P registration service keep track of these events and when a certain threshold is reached, the P2P registration service notifies B and removes B, when B does not change the behavior.

Evil Attack Scenario #1

'B' can wrongly notify the P2P registration service about A saying that A is not servicing B's requests or B can report low processing throughput or low access time when B attempts to access A. In such case, the P2P registration service checks the corresponding data reported by B. If the reporting information from B does not match what other peer clients are reporting about A, then either B is denigrating A or B is just mistaken about A. So, the P2P registration service marks both A and B for further monitoring with respect to this event and assigns a new peer to B and another new peer to A and then removes the A-B P2P association. If B again repeats this trick with its new peer, then the P2P registration service marks B again for further monitoring and again changes the peer relationship with B and its new peer and then gives B yet another peer. If this continues for a threshold or policy violating number of iterations, then the P2P registration service decides finally that B must be the culprit and deducts a remark count of A and other peers with whom B misbehaved previously.

A remark count is a form of reputation that the P2P registration service can keep about the peer clients in the P2P data sharing and data management service. Also, after deciding B was culprit, the P2P registration service removes B from access to the P2P data sharing and data management service. Also, instead of reducing remark counts of A and others, the P2P registration service can simply not do anything but remove B from service and mark B as culprit. Now, if there are many such evil attackers then remark counts for genuine ones like A may increase in such case if it crosses certain threshold then the P2P registration service sees how many of these remarks contained evil users, such as B, and in association with those decrease A's remark count accordingly by that much. So, if A is genuine, even if A's remark count increases then there is still no problem as the effective count remains at zero.

Evil Attack Scenario 2

If 'B' increases its allowable number of connections when uploading or downloading B's own data and then decreases the allowable number of connections immediately after B's work is completed; thereby, using maximum requests for B's own purpose and at the same time limiting the number of peers that B can serve then B is likely a problem. This is addressed with the preference P calculation, discussed above.

Basically because of the P2P registration service's coordination, no peer client can connect to other peer clients without permission. Also, the peer selection is done by the P2P registration service and not by the individual peers. This is important because Disk Operating System (DOS) attacks can occur otherwise.

Figure 2:
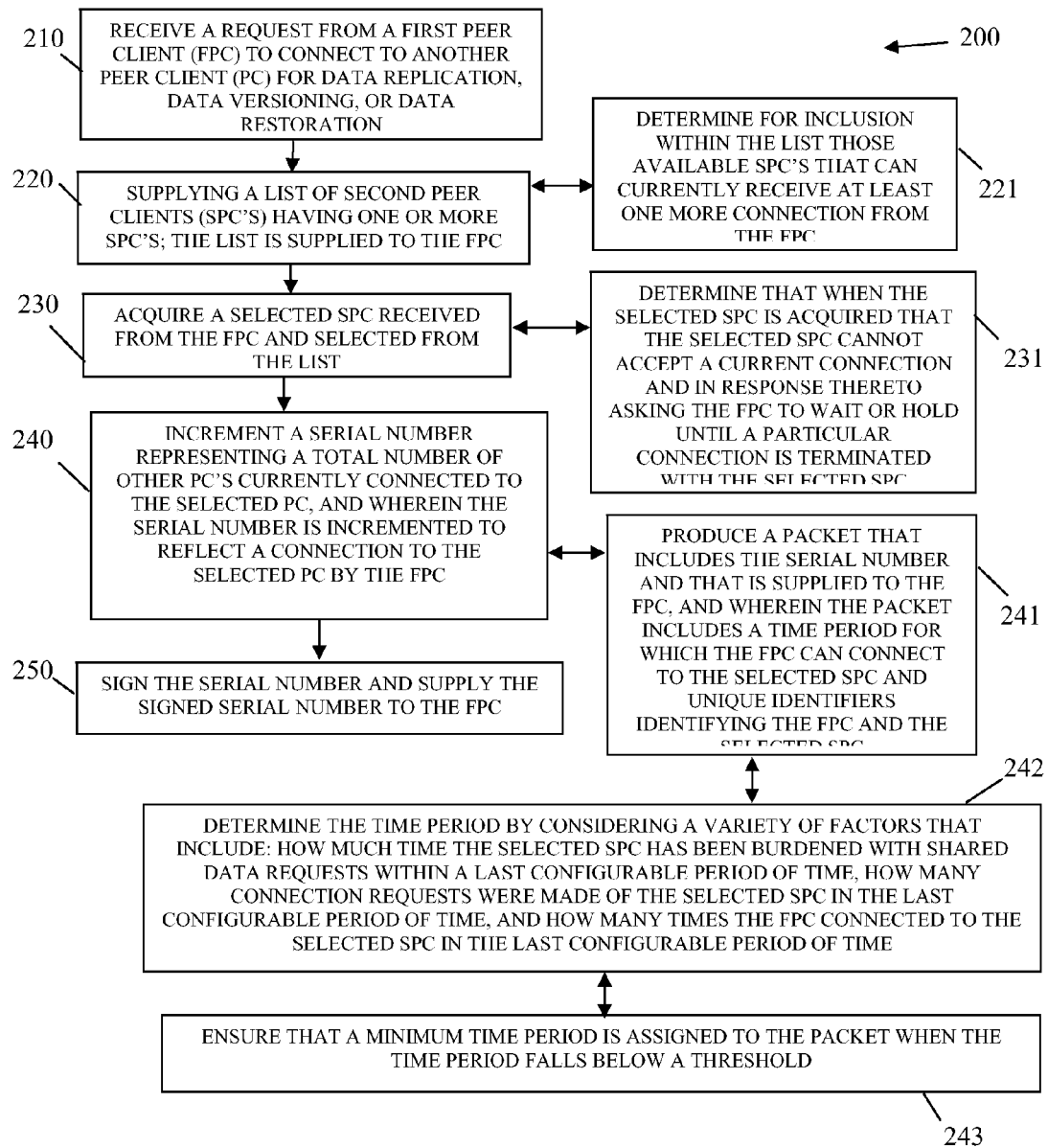
FIG. 2 is a diagram a method for centralized P2P data sharing and management, according to an example embodiment.

FIG. 2 is a diagram a method 200 for centralized P2P data sharing and management, according to an example embodiment. The method 200 (hereinafter "P2P centralized data management service") is implemented in a machine-accessible and readable medium and is accessible over a network. The network may be wired, wireless, or a combination of wired and wireless. The P2P centralized data management service presents an operational and enhanced perspective to the P2P registration service represented by the method 100 of the FIG. 1.

At 210, the P2P centralized data management service receives a request from a first peer client to connect to another peer client for data replication, data versioning, and/or data restoration. The first peer client has already registered for P2P data sharing and management with the P2P registration service of the method 100 and discussed with respect to the FIG. 1 when the first peer client makes the request to connect with another peer client.

At 220, the P2P centralized data management service supplies a list of second peer clients to the first peer client in response to the request. In some cases, the list may include reference to a single second peer client (in other words a list of one). In other cases, the list includes a plurality of second peer clients (two or more). In a specific embodiment, the list includes a minimum of 4 second peer clients and a maximum of 10 peer clients.

According to an embodiment, at 221, the P2P centralized data management service determines for inclusion within the list just those second peer clients that have or can service the first peer client and are currently capable of receiving at least one more connection from the first peer client. In other words, those second peer clients that are already servicing their maximum number of P2P connections can be excluded from the list. In some cases; however, a particular second peer client may be needed by the first peer client and thus it is included in the list but the first peer client is notified that there may be a wait before access to that particular second peer client is granted.

At 230, the P2P centralized data management service acquires a selected second peer client from the first peer client. So, the first peer client makes a selection from the list and reports that selection back to the P2P centralized data management service as the selected second peer client.

In an embodiment, at 231, the P2P centralized data management service determines that when the selected second peer client is acquired that the second peer client cannot now accept a current connection. Thus, the P2P centralized data management service asks the first peer client to wait or hold until a particular connection is terminated or becomes available with the selected second peer client.

At 240, the P2P centralized data management service increments a serial number, which represents a total number of other peer clients currently connected to the selected second peer client. The serial number is incremented to reflect a new connection to the selected second peer client by the first peer client.

According to an embodiment, at 241, the P2P centralized data management service produces a packet that includes the serial number and that is also supplied to the first peer client. The packet includes additional information, such as a time period for which the first peer client can connect to the selected second peer client and also includes unique identifiers that identify the first peer client and the selected second peer client.

In a particular situation, at 242, the P2P centralized data management service determines the time period by considering a variety of factors that can include the following: how much time the selected second peer client has been burdened with shared data requests within a last configurable period of time; how many connection requests were made of the selected second peer client in the last configurable period of time; and how many times the first peer client connected to the selected second peer client in the last configurable period of time.

Also, at 243, the P2P centralized data management service ensures that even when the time period determined at 242 is made that the time period is always set to at least some minimal amount of time. This can be done by comparing the time period determined at 242 against a policy or threshold for a minimum time period.

At 250, the P2P centralized data management service digitally signs the serial number (and packet when applicable) and then supplies the signed serial number to the first peer client. Subsequently, the first peer client presents the signed serial number (or packet as the case may be) to the selected second peer client. The selected second peer client verifies the signature and provides P2P data sharing and management services to the first peer client. Example processing associated with this was described above with the illustrations that immediately followed the discussion associated with the FIG. 1.

Figure 3:
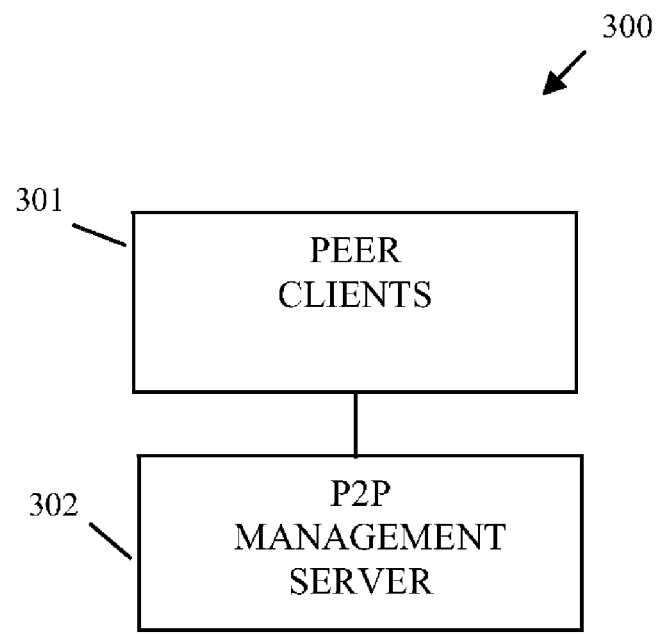
FIG. 3 is a diagram of a P2P data management and sharing system, according to an example embodiment.

FIG. 3 is a diagram of a P2P data management and sharing system 400, according to an example embodiment. The P2P data management and sharing system 400 is implemented in a machine-accessible and computer-readable medium and is accessible over a network. The network may be wired, wireless, or a combination of wired and wireless. In an embodiment, the P2P data management and sharing system 400 implements, among other things, the methods 100 and 200 of the FIGS. 1 and 2, respectively.

The P2P data management and sharing system 400 includes a plurality of peer clients 301 and a P2P management server 302. Each of these and their interactions with one another will now be discussed in detail.

The peer clients 301 are each implemented in a machine-accessible and computer-readable medium and each are located separate from one another over a network as its own independent peer client machine.

In an embodiment, each of the peer clients 301 independently report usage statistics back to the P2P management server 302 upon termination of connections with one another. In response to this, the P2P management server 302 determines when and if attacks are being made against any of the peer clients 301 involved in P2P connections with one another. The attacks (as discussed above) can be abuse of policy and do not have to be malicious in all cases.

For example, in a particular situation a number of the peer clients 301 report back to the P2P management server 302 that a particular peer client 301 is terminating peer connections prematurely and in manners not agreed to by the other peer clients 301. In such a situation, the P2P management server 302 notifies the particular peer client 301 to stop prematurely terminating the peer connections and then monitors subsequent actions by that particular peer client 301. When a threshold is reached with the particular peer client 301 still continuing in the unacceptable behavior, the P2P management server 302 removes the particular peer client 301 from access to the network for purposes of the P2P data replication and versioning.

In another case, a particular peer client 301 repeatedly sends negative or defamatory information to the P2P management server 302 regarding another peer client 301. The P2P management server 302 subsequently determines that the negative information is in fact false and in response to this removes the particular peer client 301 from access to the network for purposes of using the P2P data replication and data versioning.

The P2P management server 302 is implemented in a machine-accessible and computer readable medium over a network. Example processing associated with the P2P management server 302 was described in detail above with reference to the methods 100 and 200 of the FIGS. 1 and 2, respectively.

The P2P management server 302 coordinates registration and management of the peer clients 301 for P2P data replication and versioning among the peer clients 301. Additionally, the P2P management server 302 provides a security mechanism for each peer client 301 when connecting or facilitating the connection to another of the peer clients 301. Examples of this via a signed serial number and signed packer were provided in detail above with reference to the method 200 of the FIG. 2.

According to an embodiment, the P2P management server 302 determines that a particular peer client 301 is selectively closing or not allowing certain P2P connections with other peer clients 301. In such a situation, the P2P management server 302 asks the particular peer client 301 to alter its behavior and to stop selectively closing or not allowing the P2P connections. When the particular peer client 301 does not stop closing connections, the P2P management server 302 removes the particular peer client 301 from access to the network for purposes of P2P data replication and versioning.

In another case, the P2P management server 302 monitors when a particular peer client 301 repeatedly increases its allowable connections when that particular peer client 301 is performing uploads and downloads from other peer clients 301 and then also decreases the allowable connections once the particular peer client 301 is completed with its uploads and downloads. The P2P management server 302 warns the particular peer client 301 to stop and when the particular peer client 301 does not stop the P2P management server 302 removes the particular peer client 301 from access to the network for purposes of the P2P data replication and data versioning.

Figure 4:
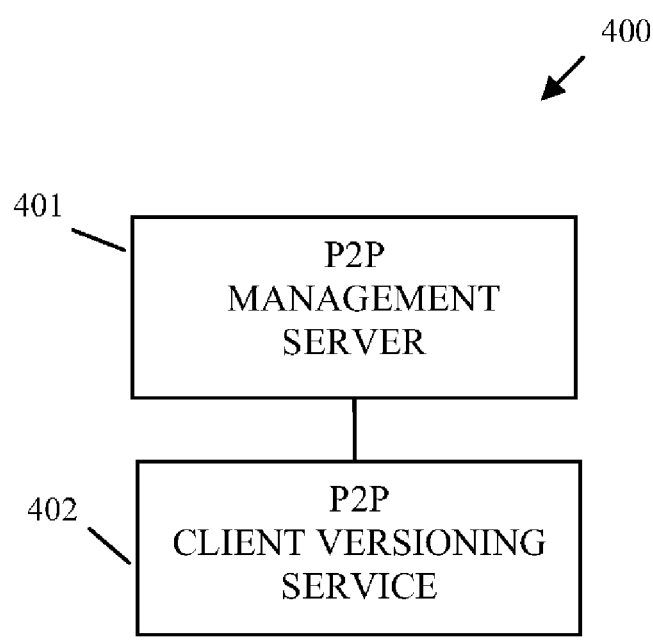
FIG. 4 is a diagram of another P2P data management and sharing system, according to an example embodiment.

FIG. 4 is a diagram of another P2P data management and sharing system 400, according to an example embodiment. The P2P data management and sharing system 400 is implemented as instructions within a machine-accessible and computer-readable medium is accessible over a network. The instructions when executed by a machine (processing device, computer, etc.) implements P2P versioning and restoration processing associated with the methods 100 and 200 of the FIGS. 1-2, respectively, and the system 300 of the FIG. 3. Furthermore, the network may be wired, wireless, or a combination of wired and wireless.

The P2P data management and sharing system 400 includes a P2P management sever 401 and a P2P client versioning service 402. Each of these and their interactions with one another will now be discussed in detail.

The P2P data management server 401 is implemented in a machine-accessible and computer-readable medium and processes on a server machine of the network. Example processing associated with the P2P data management server 401 was described in detail above with reference to the methods 100, 200, and the system 300 of the FIGS. 1-3, respectively.

The P2P client versioning service 402 is implemented in a machine-accessible and computer-readable medium and processes on a client peer machine over the network.

The P2P client versioning service 402 interacts with the P2P management sever 401 to acquire connections to other peer clients from a particular peer client to which the P2P client versioning service 402 is associated and processing on. Moreover, the P2P client versioning service 402 maintains a list of modified files on the client machine that are to be versioned on the other peer clients once the P2P management sever 401 establishes a particular connection for the P2P client versioning service 402 or facilitates that particular connection.

In an embodiment, the P2P client versioning service 402 maintains a map as to where each client file is versioned on the other peer clients. Each versioned file is also replicated, in some embodiments, over the network on different ones of the other peer clients from particular peer clients that included a particular versioned file. In other words, the client machine, via the P2P client versioning service 402, versions files modified via P2P connections facilitated by the P2P management server on one or more first peer clients and those versioned files are also replicated to one or more second peer clients for backup and disaster recovery purposes.

According to an embodiment, the P2P client versioning service 402 permits a principal (automated service or user), which is associated with the client machine, to restore particular files that have previously been versioned via interaction with the P2P management server 401. This allows a P2P restore connection with an appropriate one of the other peer clients having the particular files that are to be restored.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented system, comprising:
   a plurality of peer clients each implemented in a non-transitory computer-readable storage medium and each located separate from one another over a network as its own a peer client machine; and
   a peer-to-peer (P2P) management server implemented in a non-transitory computer-readable storage medium over the network;
   wherein the P2P management server coordinates the registration and management of the peer clients for P2P data replication and versioning among the peer clients, and wherein the P2P management server provides a security mechanism for each peer client when connecting to another of the peer clients, and wherein a number of the peer clients report back to the P2P management server that a particular peer client is terminating peer connections prematurely in manners not agreed to by the peer clients, and wherein the P2P notifies the particular peer client to stop prematurely terminating the peer connections and monitors subsequent actions by the articular peer client and when a threshold is reached with the particular peer client continuing, the P2P management server removes the particular peer client from access to the network for purposes of the P2P data replication and data versioning.

2. The system of claim 1, wherein each of the peer clients independently report usage statistics back to the P2P management server upon termination of connections with one another and in response thereto the P2P management server determines if attacks are being made against any of the peer clients involved in the connections.

3. A computer-implemented system, comprising:
   a plurality of peer clients each implemented in a non-transitory computer-readable storage medium and each located separate from one another over a network as its own a peer client machine; and
   a peer-to-peer (P2P) management server implemented in a non-transitory computer-readable storage computer readable medium over the network;

wherein the P2P management server coordinates the registration and management of the peer clients for P2P data replication and versioning among the peer clients, and wherein the P2P management server provides a security mechanism for each peer client when connecting to another of the peer clients, wherein the P2P management sever determines that a particular peer client is selectively closing or not allowing certain P2P connections with other peer clients, and wherein the P2P management server asks the particular peer client to alter its behavior to stop selectively closing or not allowing the P2P connections and when the particular peer client does not the P2P management server removes the particular peer client from access to the network for purposes of the P2P data replication and data versioning.

4. The system of claim 3, wherein the P2P management server is further configured to monitor actions of the P2P clients for compliance to a policy.

5. A computer-implemented system, comprising:
- a plurality of peer clients each implemented in a non-transitory computer-readable storage medium and each located separate from one another over a network as its own a peer client machine; and
- a peer-to-peer (P2P) management server implemented in non-transitory computer readable storage medium over the network;
- wherein the P2P management server coordinates the registration and management of the peer clients for P2P data replication and versioning among the peer clients, and wherein the P2P management server provides a security mechanism for each peer client when connecting to another of the peer clients, wherein a particular peer client repeatedly sends negative information to the P2P management server regarding another peer client, and wherein the P2P management server determines that the negative information is in fact false, and wherein the P2P management server removes the particular peer client from access to the network for purposes of the P2P data replication and data versioning.

6. The system of claim 5, wherein the P2P management server is further configured to monitor actions of the P2P clients and permit violations to a policy being monitored by the P2P management server for a predetermined number of iterations defined by a threshold before taking action.

7. A computer-implemented system, comprising:
- a plurality of peer clients each implemented in a non-transitory computer-readable storage medium and each located separate from one another over a network as its own a peer client machine; and
- a peer-to-peer (P2P) management server implemented in non-transitory computer readable storage medium over the network;
- wherein the P2P management server coordinates the registration and management of the peer clients for P2P data replication and versioning among the peer clients, and wherein the P2P management server provides a security mechanism for each peer client when connecting to another of the peer clients, wherein the P2P management server monitors when a particular peer client repeatedly increases its allowable connections when that particular peer client is performing uploads and downloads from other peer clients and then decreases the allowable connections once the particular peer client is completed with its uploads and downloads, and wherein the P2P management server warns the particular peer client to stop and when the particular peer client does not stop the P2P management server removes the particular peer client from access to the network for purposes of the P2P data replication and data versioning.

8. The system of claim 7, wherein the P2P management server is further configured to record usage statistics reported back from each of the P2P clients.

9. The system of claim 8, wherein the P2P management server is also configured to evaluate the usage statistics to determine when attacks are being made against any of the P2P clients.

* * * * *

UNITED STATES PATENT AND TRADEMARK OFFICE
CERTIFICATE OF CORRECTION

| | |
|---|---|
| PATENT NO. | : 7,996,547 B2 |
| APPLICATION NO. | : 12/793926 |
| DATED | : August 9, 2011 |
| INVENTOR(S) | : Gosukonda Naga Venkata S. Sudhakar |

It is certified that error appears in the above-identified patent and that said Letters Patent is hereby corrected as shown below:

In column 12, lines 48-49, in Claim 1, delete "articular" and insert -- particular --, therefor.

In column 13, line 13, in Claim 4, delete "not the" and insert -- not stop the --, therefor.

Signed and Sealed this
Eleventh Day of October, 2011

David J. Kappos
*Director of the United States Patent and Trademark Office*